2 Sheets—Sheet 1.
W. EVERITT.
Land-Marker.
No. 209,611. Patented Nov. 5, 1878.
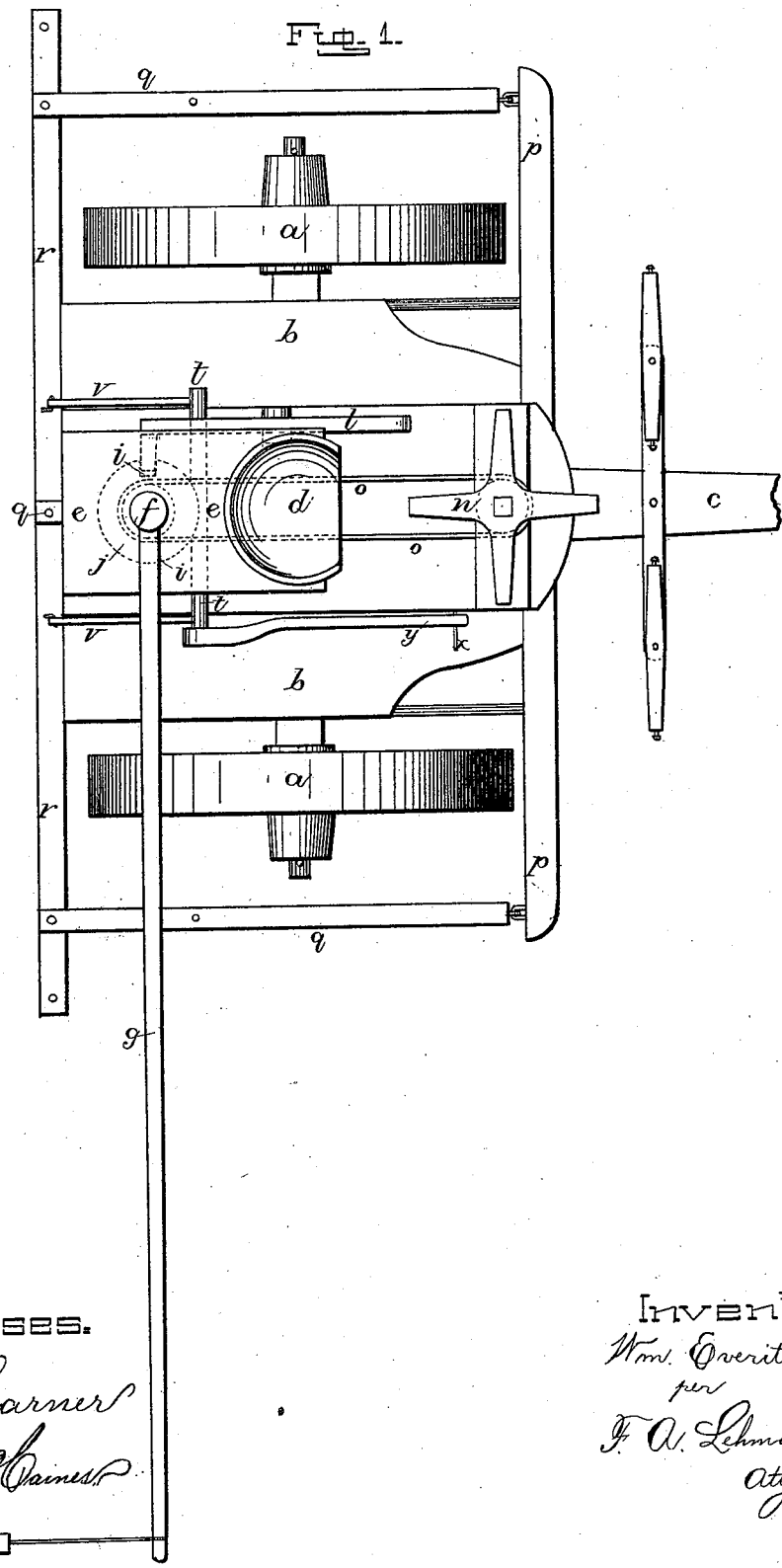
Witnesses.
J. W. Garner
W. L. D. Haines
Inventor.
Wm. Everitt,
per
F. A. Lehmann,
Atty 2 Sheets—Sheet 2.
W. EVERITT.
Land-Marker.
No. 209,611. Patented Nov. 5, 1878.
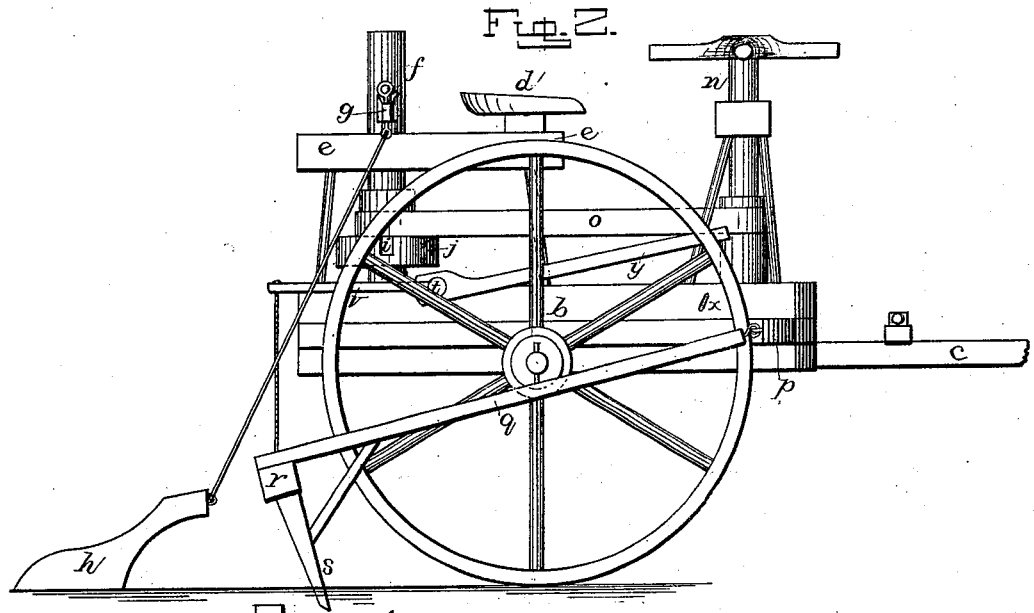
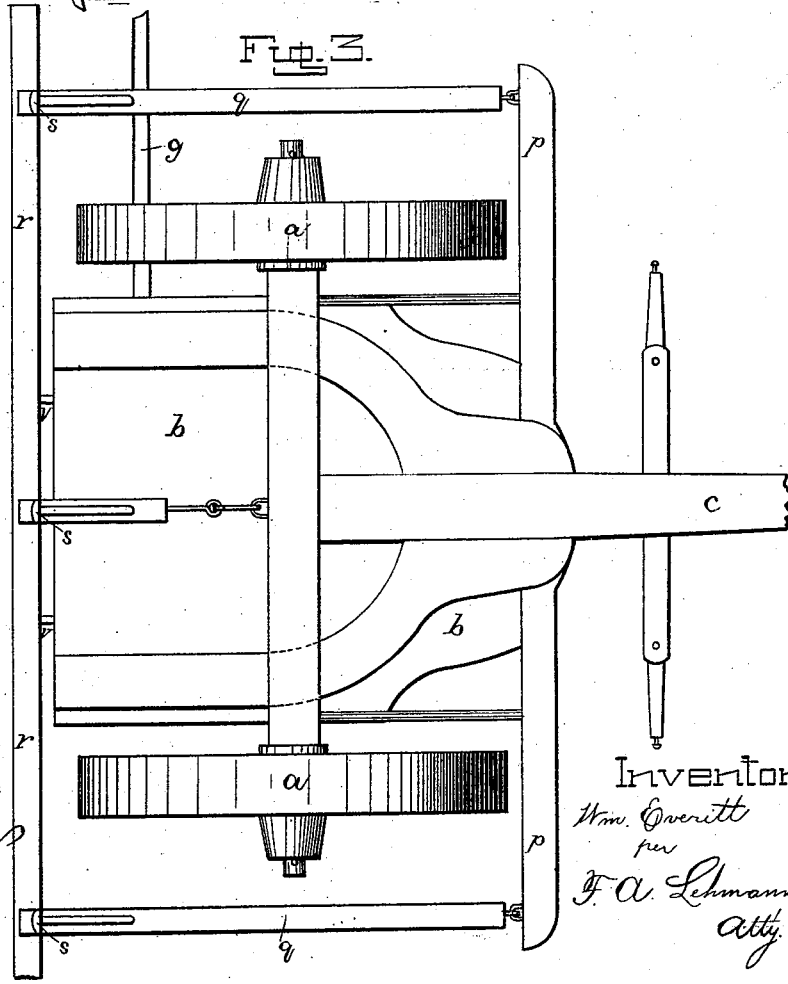
Witnesses:
Inventor:
Wm. Everitt
per
F. A. Lehmann,
Atty.

UNITED STATES PATENT OFFICE.

WILLIAM EVERITT, OF DELAWARE STATION, NEW JERSEY.

IMPROVEMENT IN LAND-MARKERS.

Specification forming part of Letters Patent No. 209,611, dated November 5, 1878; application filed September 13, 1878.

*To all whom it may concern:*

Be it known that I, WILLIAM EVERITT, of Delaware Station, in the county of Warren and State of New Jersey, have invented certain new and useful Improvements in Land-Markers; and I do hereby declare the following to be a full, clear, and exact description of the invention, such as will enable others skilled in the art to which it pertains to make and use it, reference being had to the accompanying drawings, which form part of this specification.

My invention relates to an improvement in corn-markers; and it consists in the combination of a windlass, a belt or chain, a partially-revolving shaft, having the rod carrying the marker fastened to it, and a locking device, all of which will be more fully described hereinafter.

Figure 1 is a plan view of my invention. Fig. 2 is a side elevation of the same. Fig. 3 is an inverted view.

$a$ represents the two driving-wheels; $b$, the frame or truck, of any suitable construction; $c$, the tongue, and $d$ the seat.

Upon the rear end of the frame $b$ is raised a smaller frame, $e$, which serves both to support the seat and to form a bearing for the upper end of the shaft $f$, which has its lower end stepped upon the top of the frame $b$. Projecting outward from the upper end of this shaft is the long rod or arm $g$, which has the drag $h$ connected to its outer end by any suitable connections, which drag forms the guiding-furrow for the machine after it has been turned around at the end of the furrow.

To the lower part of the shaft is secured the disk $j$, which has the two notches $i$ made in its opposite edges on a line with the rod $g$, for the projection on the end of the lever $l$ to catch in. This lever is pivoted upon the top of the frame, and has its front end projecting forward beyond the front edge of the seat, so that the driver can press down upon it with his foot, and thus raise the rear end out of the notch $i$ in the disk $j$ and leave the shaft $f$ free to revolve. After the machine has reached the end of the furrow and has been turned around, with the tongue just over the guide mark or furrow made by the drag $h$, the driver catches hold of the windlass $n$, around the lower end of which passes the chain, belt, or cord $o$ back to the shaft $f$, and after releasing the disk from the lever turns the windlass around toward the left until the arm $g$ reaches the opposite side of the machine, when the lever again locks the disk in position.

Fastened to the rods $p$, which project from the front corners of the machine and to the rear of the axle, by means of the rods $q$, is the beam $r$, from the lower side of which project any suitable number of furrow-markers, $s$. In order to prevent these markers from running along the ground when not needed, a shaft, $t$, provided with the arms $v$, is fastened upon the top of the frame $b$, which arms are connected at their rear ends to the beam $r$.

To one end of the shaft is rigidly secured the foot-lever $y$, which projects forward beyond the front edge of the right side of the seat, and may be held down in any position by means of a pin, $x$, or any other device. As the two foot-levers are arranged so that the driver can put his feet upon them at any moment, all of the operating parts of the machine are constantly under his control without having to use his hands, except in turning the windlass.

Having thus described my invention, I claim—

The combination of the windlass $n$, belt or chain $o$, shaft $f$, arm $g$, provided with drag $h$ and a locking device, substantially as shown.

In testimony that I claim the foregoing I have hereunto set my hand and seal this 29th day of August, 1878.

WILLIAM EVERITT. [L. S.]

Witnesses:
JOSIAH DE WITT,
JOHN B. WOLFE.